UNITED STATES PATENT OFFICE.

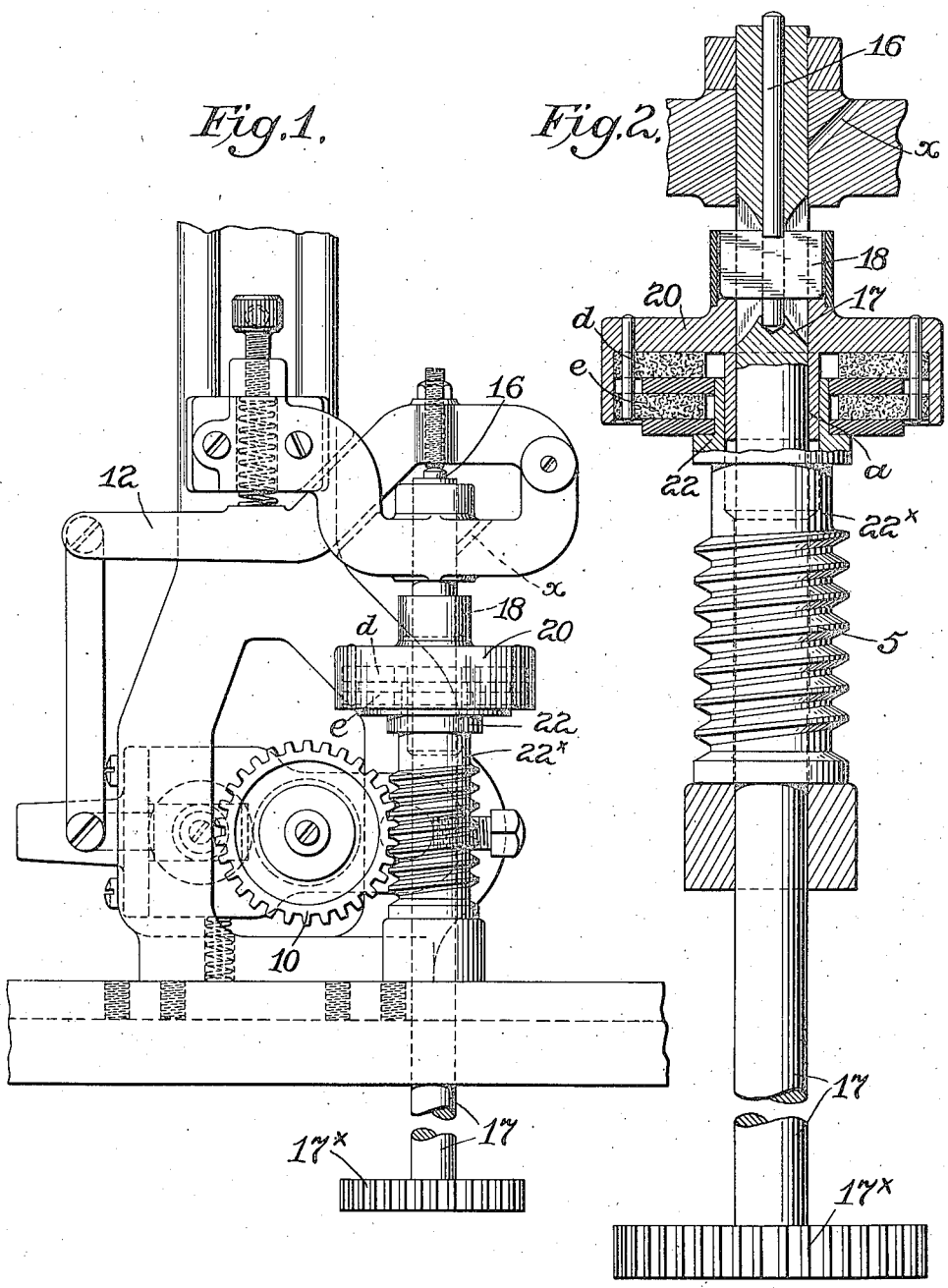

GEORGE LAWSON BALLARD, OF NORRISTOWN, PENNSYLVANIA, ASSIGNOR TO WILDMAN MFG. CO., OF NORRISTOWN, PENNSYLVANIA, A CORPORATION OF PENNSYLVANIA.

DRIVING MECHANISM.

1,167,875.   Specification of Letters Patent.   Patented Jan. 11, 1916.

Application filed April 12, 1915. Serial No. 20,887.

*To all whom it may concern:*

Be it known that I, GEORGE LAWSON BALLARD, a subject of the King of Great Britain, residing at Norristown, Pennsylvania, have invented certain new and useful Improvements in Driving Mechanism, of which the following is a specification.

The invention relates to driving mechanism and has been designed especially for connection with that form of take-up mechanism shown in Letters Patent of the United States granted to me November 23, 1909, #940,656. The present improvement is designed to increase the efficiency of the friction clutch mechanism shown in said patent and to render its operation certain under all conditions.

In the accompanying drawings, Figure 1 is a side view of a take-up mechanism in which my invention is combined, and Fig. 2 is a sectional view through the clutch device and associated parts.

In the operation of the take-up mechanism the take-up rolls are driven through the shaft 17 from a gear $17^x$, which meshes with a stationary rack on the machine frame, the said shaft being carried around with the take-up plate as in ordinary practice whereby its pinion is made to rotate by engaging with the said fixed rack. The shaft has loosely mounted thereon a worm 5 which drives the worm wheel 10 on one of the take-up rolls. The worm is connected with a sleeve $22^x$ which in turn carries the lower clutch member 22. There is also provided an upper clutch member 20, which is keyed to the shaft 17 by a key piece 18 passing through the shaft and having its ends engaging recesses or slots in the hub of the upper clutch member. The clutch has fiber washers $d$, $e$, through which the motion of the upper clutch member is transmitted to the lower clutch member. The upper clutch member is pressed upon to force the fiber washers and parts with which they engage into strong frictional contact. This pressure may be derived in any suitable way but in the particular construction shown it is communicated through a lever 12 and a pin 16. By this construction the frictional contact between the clutch members is varied in degree so that the clutch will either slip or drive according to the demands of fabric production or the tension on the fabric between the take-up rolls and the needles. It will be observed that the drive of the take-up roll takes place through the worm and this worm is driven through the frictional clutch having the fiber washers, and the friction clutch in turn is driven through the shaft 17.

Difficulty has been experienced because of the lubricating oil reaching the fiber washers and changing the conditions here to such an extent as to render the operation of the clutch uncertain and particularly decreasing the sensitiveness of the clutch and its capacity to quickly release itself to reduce its driving function or power when conditions at the fabric require this. I have found that this objection arises from the oil reaching the fiber washers and becoming sticky and of an adhesive quality and that changes in temperature create variations in condition within the clutch, a high temperature keeping the oil more nearly in its natural condition and allowing the clutch to perform its prescribed function, whereas with a lower temperature the sticky or adhesive quality of the oil becomes pronounced and the clutch will not release with the promptness that is necessary for the best effects. It is necessary of course to apply oil to the shaft 17 to lubricate the same and the parts associated therewith and this is done by applying oil through an opening at $x$. As above stated, this oil in former constructions has reached the fiber washer of the clutch device giving rise to the objections stated. In order to avoid this objection I provide a shield within the clutch so as to direct the oil along the shaft past the clutch so as to prevent its entrance thereinto and its collection upon or about the friction disk. This shield is shown at $a$ and may assume different constructions but in the particular construction shown it is in the form of a sleeve made integral with the upper clutch member and extending along and close to the shaft and to a point below the upper part of the lower clutch member and completely past the fiber disks so that the oil in passing down along the vertical shaft will be directed past the clutch members and may reach the lower parts to be lubricated without reaching the friction members of the clutch. By this arrangement the sensitiveness of the clutch is maintained, which is an important factor in the proper working of a take-up mechanism for the fabric of a knitting machine, as this take-up mechanism must respond instantly to the demands due to changes in the tension of the fabric.

With my improvement the release of the clutch will take place instantly, whereas without my improvement the clutch will not respond instantly under certain conditions in releasing the worm from the full driving power.

The fiber material for the clutch members may be in the form of cardboard known as millboard, or any other material such as cork, asbestos, or leather may be used, and any material which would be affected by the oil and produce the disadvantageous results mentioned by the oil reaching it would fall within the scope of the invention.

It will be noticed from the drawing that the shield or sleeve *a* extends along the shaft and well within the upstanding sleeve of the lower clutch member, which carries the disk or ring that co-acts with the fiber disk or ring. By this construction the lower end of the shield extends to a point some distance below the upper edge of the sleeve or upper tubular part of the worm and well beyond the friction disks.

I claim as my invention:

In combination in driving mechanism a vertical shaft with means for driving the same, a worm on the said shaft to be driven thereby and a friction clutch connection between the shaft and worm consisting of a clutch member keyed to and free to be pressed along the said shaft, said clutch member carrying a fiber disk or ring, a ring or disk engaging the said fiber disk, a shield on the clutch member extending along the shaft and past the fiber disk and the other disk mentioned, the said worm having an extension carrying the last mentioned disk and surrounding the shield, substantially as described.

In testimony whereof, I affix my signature in presence of two witnesses.

GEORGE LAWSON BALLARD.

Witnesses:
 CORA TURNER FELTON,
 OWEN BALLARD.